United States Patent
Liu et al.

(10) Patent No.: US 12,147,136 B2
(45) Date of Patent: Nov. 19, 2024

(54) ARRAY SUBSTRATE, DISPLAY DEVICE AND DRIVING CIRCUIT

(71) Applicant: HKC CORPORATION LIMITED, Shenzhen (CN)

(72) Inventors: Yunyang Liu, Shenzhen (CN); Jie Wang, Shenzhen (CN); Yuchun Xu, Shenzhen (CN); Li Lv, Shenzhen (CN); Guangchen Zhang, Shenzhen (CN); Zhiwei Li, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 48 days.

(21) Appl. No.: 18/086,629

(22) Filed: Dec. 21, 2022

(65) Prior Publication Data
US 2024/0045290 A1    Feb. 8, 2024

(30) Foreign Application Priority Data
Jul. 29, 2022 (CN) .......................... 202210905349.4

(51) Int. Cl.
*G02F 1/1362* (2006.01)
*G09G 3/36* (2006.01)

(52) U.S. Cl.
CPC .. *G02F 1/136286* (2013.01); *G02F 1/136222* (2021.01); *G09G 3/3614* (2013.01)

(58) Field of Classification Search
CPC ........... G02F 1/136286; G02F 1/13629; G02F 1/134363; G02F 1/134372; G09G 2300/0823; G09G 3/3614
See application file for complete search history.

(56) References Cited

U.S. PATENT DOCUMENTS

2017/0192312 A1* 7/2017 Kim ...................... G02F 1/1368
2022/0319454 A1* 10/2022 Tsuchi .............. G02F 1/136286

FOREIGN PATENT DOCUMENTS

| CN | 103488019 A | 1/2014 |
| CN | 106707640 A | 5/2017 |
| CN | 109856870 A | 6/2019 |
| CN | 111580317 A | 8/2020 |
| CN | 114690491 A | 7/2022 |

* cited by examiner

*Primary Examiner* — Angela K Davison (57) ABSTRACT

An array substrate, a display device, and a driving circuit are disclosed. The array substrate includes a substrate, a pixel electrode layer disposed on the substrate, a first insulating layer disposed on the substrate, multiple data lines disposed on the first insulating layer, a second insulating layer disposed on the first insulating layer and covering the data lines, a common electrode layer disposed on the second insulating layer, and multiple data signal cancellation lines disposed between the common electrode layer and the first insulating layer. The common electrode layer includes multiple common shield electrode layers. The data signal cancellation lines are disposed in one-to-one correspondence with the data lines. Along the direction from the pixel electrode layer toward the common electrode layer, one common shield electrode layer covers one respective data signal cancellation line and one respective data line.

10 Claims, 4 Drawing Sheets

ARRAY SUBSTRATE, DISPLAY DEVICE AND DRIVING CIRCUIT

CROSS-REFERENCE TO RELATED APPLICATIONS

This application claims the priority and benefit of Chinese patent application 2022109053494, titled "Array Substrate, Display Device and Driving Circuit" and filed Jul. 29, 2022, with China National Intellectual Property Administration, the entire contents of which are incorporated herein by reference.

TECHNICAL FIELD

The present application relates to the technical field of display panels, and more particularly relates to an array substrate, a display device, and a driving circuit.

BACKGROUND

The description provided in this section is intended for the mere purpose of providing background information related to the present application but doesn't necessarily constitute prior art.

Liquid Crystal Display (LCD) has many advantages such as thin body, power saving, and no radiation, and has been widely used. For example, it has been used in LCD TV, mobile phone, personal digital assistant (PDA), digital camera, computer screens, or notebook computer screens, etc., and has dominated the field of flat panel display.

The working principle of a liquid crystal panel consists in controlling the rotation of the liquid crystal molecules of the liquid crystal layer by applying driving voltages to the pixel electrode and the common electrode, so as to refract the light of the backlight module to generate an image. There are multiple data lines (Data) on the array substrate. The voltage change on the data line will affect the voltage of the common electrode above the data line. The voltage of the common electrode above the data line increases or decreases sharply, so that the common electrode voltage value on the entire array substrate deviates from the expected normal common electrode voltage value, such that the pixel electrode and the common electrode cannot form the electric field required for normally displaying an image, which makes it easy to cause horizontal crosstalk (H-crosstalk) or brightness unevenness and other undesirable phenomena.

SUMMARY

In view of the above, it is therefore a purpose of the present application to provide an array substrate, a display device and a driving circuit, which can improve the problem that the display panel is prone to horizontal crosstalk or uneven brightness due to voltage changes of the data lines.

The present application discloses an array substrate, including a substrate, a pixel electrode layer, a first insulating layer, a plurality of data lines, a second insulating layer, a common electrode layer, and a plurality of data signal cancellation lines. The pixel electrode layer is disposed on the substrate. The first insulating layer is disposed on the substrate and covers the pixel electrode layer. The plurality of data lines are disposed on the first insulating layer. The second insulating layer is disposed on the first insulating layer and covers the plurality of data lines. The common electrode layer is disposed on the second insulating layer. The common electrode layer includes a plurality of common shield electrode layers. The plurality of data signal cancellation lines are disposed between the common electrode layer and the first insulating layer. The data signal cancellation lines are disposed in one-to-one correspondence with the data lines. The voltage signal of the data signal cancellation line is opposite in polarity to the voltage signal of the data line. The data signal cancellation line is arranged along the extending direction of the data line. Along the direction of the pixel electrode layer toward the common electrode layer, one of the common shield electrode layers covers one of the data signal cancellation lines and one of the data lines. A gap is formed between a projection of each data line along a direction perpendicular to the substrate and a projection of the data signal cancellation line along the direction perpendicular to the substrate, and the width of the gap is greater than or equal to a preset distance.

In some embodiments, the data signal cancellation line is arranged on the first insulating layer, and is disposed in the same layer as the respective data line. The width of the gap formed between the data signal cancellation line and the data line is greater than the preset distance. The preset distance is greater than zero and less than or equal to a difference between the width of the common electrode layer and the total width of the data signal cancellation line and the data line.

In some embodiments, the distance between the data line and the data signal cancellation line is greater than or equal to 2.5 microns.

In some embodiments, the data signal cancellation line is disposed in the second insulating layer, and is disposed in a different layer from the data line. The distance from the data signal cancellation line to the first insulating layer is greater than the distance from the data line layer to the first insulating layer. Along the direction of the pixel electrode layer toward the common electrode layer, the gap formed between a vertical projection of the data line along a direction perpendicular to the substrate and a vertical projection of the data signal cancellation line along the direction perpendicular to the substrate is equal to the preset distance. The preset distance is greater than or equal to zero, and less than or equal to the difference between the width of the common electrode layer and the total width of the data signal cancellation line and the data line.

In some embodiments, the data signal cancellation line includes a first data signal cancellation line and a second data signal cancellation line. The first data signal cancellation line is located on the left side of the data line and is spaced from the data line. The second data signal cancellation line is located on the right side of the data line and is spaced from the data line. The voltage signal of the first data signal cancellation line and the voltage signal of the second data signal cancellation line have the same polarity. Both the voltage signal of the first data signal cancellation line and the voltage signal of the second data signal cancellation line are opposite in polarity to the voltage signal of the data line.

In some embodiments, both the first data signal cancellation line and the second data signal cancellation line are disposed on the first insulating layer, and are disposed in the same layer as the data line.

In some embodiments, the first data signal cancellation line and the second data signal cancellation line are disposed in the same layer. The first data signal cancellation line and the second data signal cancellation line are arranged in a different layer from the data line. The distance from the first data signal cancellation line to the first insulating layer is greater than the distance from the data line layer to the first insulating layer.

In some embodiments, the first data signal cancellation line, the second data signal cancellation line, and the data line are all disposed at different layers. In the direction from the pixel electrode layer to the common electrode layer, the interval between the first data signal cancellation line along a direction parallel to the substrate and the data line is zero, and the interval between the second data signal cancellation line and the data line along the direction parallel to the substrate is zero.

The present application further discloses a display device, including a color filter substrate and the array substrate described in any one of the above embodiments. The color filter substrate and the array substrate are aligned and assembled together.

The present application further discloses a driving circuit for driving the array substrate described in any one of the above embodiments. The driving circuit includes a drive chip. The drive chip includes multiple groups of pins. A group of said pins includes a first pin and a second pin. The first pin is connected to the data line. The second pin is connected to the data signal cancellation line. The first pin outputs a first voltage signal to the data line. The second pin outputs a second voltage signal to the data signal cancellation line. The first voltage signal and the second voltage signal have opposite polarities.

In the present application, a data signal cancellation line is arranged, and the data signal cancellation line generates a voltage signal whose polarity is opposite to that of the voltage signal of the respective data line, so as to cancel the influence of the parasitic capacitance formed between the data line and the common electrode layer, so that the voltage offset of the common electrode layer above the data line will not be too large, thereby improving the problem that the display panel is prone to horizontal crosstalk or uneven brightness due to voltage changes of the data lines.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments. It should be noted that, should no conflict is present, the various embodiments or technical features described below can be combined arbitrarily to form new embodiments.

In an LCD panel setup, a plurality of data lines and scan lines may be arranged on the array substrate. Because the voltage change of the data line may affect the liquid crystal in the area above the data line, the display screen in this area may appear abnormal. Therefore, a black matrix corresponding to the position of the data line may be set on the color filter substrate to block this area. But this will cause the problem of low aperture ratio of the display panel. In the display panel with Top com structure, the common electrode layer is disposed above the data line, the pixel electrode layer is disposed under the common electrode layer, and so the data line is covered by the common electrode layer alleviate the influence of the data line on the liquid crystal located above the data line, so that the width of the black matrix disposed on the color filter substrate can be reduced, improving the aperture ratio of the display panel. However, the inventor found that in this Topcom structure, although the aperture ratio of the display panel can be increased, the voltage change on the data line may affect the common electrode located above the data line, resulting in parasitic capacitance between the data line and the common electrode. This leads to the voltage shift of the common electrode in this area, which is easy to cause undesirable phenomena such as horizontal crosstalk or uneven brightness. Therefore, considering the problems in the above solutions, the inventor has achieved an improved solution of the present application under continuous research and experiments, which are as follows.

Figure 1:
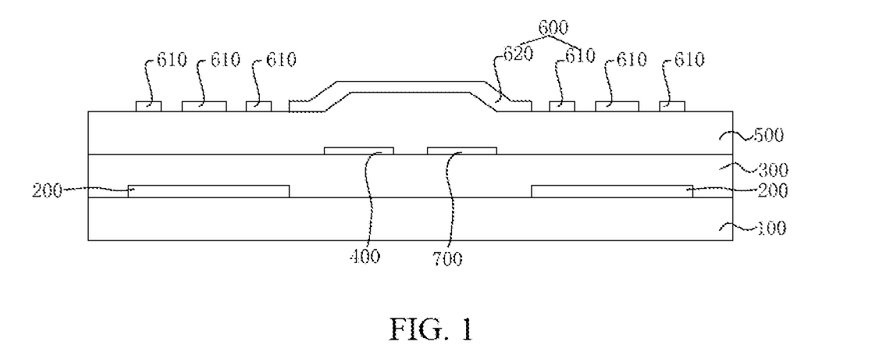
FIG. 1 is a schematic diagram of a data signal cancellation line and a data line being disposed in a same layer in an array substrate according to a first embodiment of the present application.

As shown in FIG. 1, as a first embodiment of the present application, an array substrate 800 is disclosed. The array substrate 800 includes a substrate 100, a pixel electrode layer 200, a first insulating layer 300, a plurality of data lines 400, a second insulating layer 500, a common electrode layer 600, and a plurality of data signal cancellation lines 700. The pixel electrode layer 200 is disposed on the substrate 100. The first insulating layer 300 is disposed on the substrate 100 and covers the pixel electrode layer 200. The data lines 400 are disposed on the first insulating layer 300. The second insulating layer 500 is disposed on the first insulating layer 300 and covers the data lines 400. The common electrode layer 600 is disposed on the second insulating layer 500. The common electrode layer includes a plurality of common shield electrode layers. The data signal cancellation lines 700 are disposed between the common electrode layer 600 and the first insulating layer 300. The data signal cancellation lines 700 are disposed in one-to-one correspondence with the data lines 400. The voltage signal of each data signal cancellation line 700 is opposite in polarity to the voltage signal of the respective data line 400. The data signal cancellation line 700 is arranged along the extending direction of the respective data line 400. In the direction of the pixel electrode layer 200 toward the common electrode layer 600, one of the common shield electrode layers covers one of the data signal cancellation lines 700 and one of the data lines 400. A gap is formed between the projection of the data line 400 along a direction perpendicular to the substrate and the projection of the data signal cancellation line 700 along the direction perpendicular to the substrate, and the width of the gap is greater than or equal to a preset distance. The data line 400 and the data signal cancellation line 700 are not electrically connected to each other.

When the voltage signal of the data line 400 changes, that is, it suddenly increases or decreases, the data line 400 and the common shield electrode layer of the common electrode layer 600 located above the data line 400 form a first parasitic capacitance. At this time, the voltage signal of the data signal cancellation line 700 also changes correspondingly with the change of the voltage signal of the data line 400. The voltage signal of the data signal cancellation line 700 is opposite in polarity to the voltage signal of the data line 400. The data signal cancellation line 700 also forms a second parasitic capacitance with the common shield electrode layer of the common electrode layer 600 located above the data signal cancellation line 700. The first parasitic capacitance and the second parasitic capacitance cancel each other, thereby improving the problem that the display panel is prone to horizontal crosstalk or uneven brightness due to the voltage change of the data line 400. To sum up, in the present application, by setting the data signal cancellation line 700, the data signal cancellation line 700 generates a voltage signal whose polarity is opposite to that of the voltage signal of the data line 400, so as to cancel the influence brought by the parasitic capacitance formed between the data line 400 and the common electrode layer 600. Therefore, the voltage shift of the common electrode layer 600 located above the data line 400 is not too large, thereby improving the problem that the display panel is prone to horizontal crosstalk or uneven brightness due to voltage change of the data line 400.

The array substrate 800 further includes a gate metal layer, a source metal layer, a drain metal layer and a semiconductor layer. The gate metal layer is formed on the substrate 100. The first insulating layer 300 covers the gate metal layer. The semiconductor layer is disposed on the first insulating layer 300. The source metal layer is disposed on the semiconductor layer. The drain metal layer is arranged on the semiconductor layer and is arranged opposite to the source metal layer. The drain metal layer is connected to the respective data line 400. The second insulating layer 500 is disposed on the drain metal layer and the source metal layer. The first insulating layer 300 defines a via hole, and the pixel electrode layer 200 is connected to the source metal layer through the via hole.

In this embodiment, the data signal cancellation line 700 is disposed on the first insulating layer 300 and is disposed in the same layer as the respective data line 400. The width of the gap formed between the data signal cancellation line 700 and the data line 400 is greater than a preset distance, wherein the preset distance is greater than zero, and less than or equal to the difference between the width of the common electrode layer 600 and the width of each of the data signal cancellation line 700 and the data line 400. The common electrode layer 600 includes a first common electrode 610 located above the pixel electrode layer 200. The common shield electrode layer includes a second common electrode 620 located above the data line 400. The second common electrode 620 covers the respective data line 400 and data signal cancellation line 700. The distance between the data line 400 and the data signal cancellation line 700 is greater than or equal to 2.5 microns, so as to prevent the data signal cancellation line 700 from contacting the data line 400. The data signal cancellation line 700 and the data line 400 are disposed in the same layer, so as to control the data signal cancellation line 700 to output a voltage signal with opposite polarity and equal magnitude to the voltage signal of the data line 400. In addition, in this embodiment, the widths of the data signal cancellation line 700 and the data line 400 are equal to each other.

Figure 2:
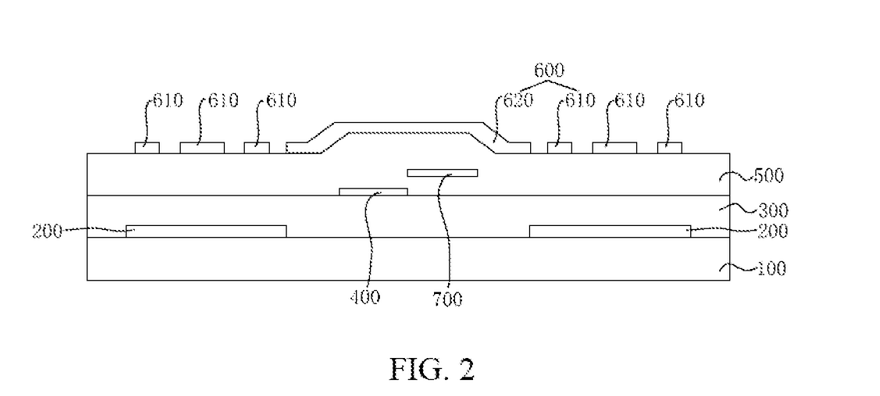
FIG. 2 is a schematic diagram of a data signal cancellation line and a data line being disposed in different layers in an array substrate according to the first embodiment of the present application.

Of course, the data signal cancellation line 700 and the data line 400 may also be disposed in different layers. As shown in FIG. 2, the data signal cancellation line 700 is disposed in the second insulating layer 500. When the data signal cancellation line 700 is disposed in a different layer from the data line 400, the distance from the data signal cancellation line 700 to the first insulating layer 300 is greater than the distance from the data line 400 layer to the first insulating layer 300. The first preset distance between the data signal cancellation line 700 and the data line 400 is equal to zero. In this way, the interval between the data signal cancellation line 700 and the data line 400 along the direction parallel to the substrate can be reduced to zero, thereby increasing the aperture ratio of the display panel with the array substrate 800. In the direction of the pixel electrode layer toward the common electrode layer, the gap formed between the data line and the vertical projection of the data signal cancellation line along the direction perpendicular to the substrate is equal to the preset distance, and the preset distance is greater than or equal to zero, and less than or equal to the difference between the width of the common electrode layer and the width of the data signal cancellation line and the data line. Furthermore, there is no upper and lower opposite area between the data signal cancellation line 700 and the data line 400, so the plate capacitance will not be formed between the data signal cancellation line 700 and the data line 400, and so the mutual influence is small. However, the voltage signal of the data signal cancellation line 700 and the voltage signal of the data line 400 are only opposite in polarity, and the voltage signal of the data signal cancellation line 700 and the voltage signal of the data line 400 are different in magnitude. Explaination will be provided as follows in conjunction with formulas.

It is assumed that the voltage signal of the data line 400 is data1, referred to as d1 for short, and the voltage signal of the data signal cancellation line 700 is data2, referred to as d2 for short. By the formula $V_{com}$ offset $\Delta V_{com} = \Delta V_{data} * (C_{dc}/C_{com})$, where $\Delta V_{data}$ refers to the voltage change of the data signal line, $C_{dc}$ refers to the capacitance between the Com electrode and the data signal line, and $C_{com}$ is the sum of all capacitances in the pixel including $C_{st}$ and the parasitic capacitance. The signals of d1 and d2 are affecting the second common electrode 620 at the same time, so the $V_{com}$ offset $\Delta V_{com} = \Delta V_{com1} + \Delta V_{com2}$, where the offset $\Delta V_{com1} = \Delta V_{d1} * (C_{d1c}/C_{com})$, and the offset $\Delta V_{com2} = \Delta V_{d2} * (C_{d2c}/C_{com})$, where $C_{d1c}$ refers to the capacitance between d1 and the second common electrode 620, and $C_{d2c}$ refers to the capacitance between d2 and the second common electrode 620. To reduce the impact, offset $\Delta V_{com1} = -$offset $\Delta V_{com2}$. Ignoring the small fringe field capacitance, and taking the plate capacitance as the main factor for calculation, the distances from d1 and d2 to the second common electrode 620 determine the absolute value of the incoming voltage signal. Assuming that the distance between d2 and the second common electrode 620 is x, the distance between d1 and d2 is y, then the distance between d1 and the second common electrode 620 is z=x+y, and the formula of the plate capacitance is $$C = \frac{\varepsilon S}{4\Pi k d},$$

where in the formula, d indicates the distance between two plates. Substitute the above x, y, z into the formula $$C = \frac{\varepsilon S}{4\Pi k d}, \text{ then } \frac{\varepsilon S}{4\Pi k}$$

can be simplified as a constant, set the constant as $$N = \frac{\varepsilon S}{4\Pi k},$$

then $C_{d1c}$, $C_{d2c}$ is simplified as, $C_{d1c} = N/(x+y)$, $C_{d2c} = N/x$. Further from the offset $\Delta V_{com1} = -$offset $\Delta V_{com2}$, substitute the above-mentioned calculation formulas of offset $\Delta V_{com1}$ and offset $\Delta V_{com2}$, then we obtain $\Delta V_{d1} * (N/[(x+y)*C_{com}]) = -\Delta V_{d2} * (N/(x*C_{com}))$. That is to say, $\Delta V_{d1}/\Delta V_{d2} = -(x+y)/x = -z/x$, namely when the normal signal d1 is pulled up, d2 needs to satisfy $\Delta V_{d1}/\Delta V_{d2} = -z/x$ in order to equally eliminate or weaken the influence of the electric field of d1.

Further, along the extending direction of the data line 400, the length of the data signal cancellation line 700 is consistent with the length of the data line 400, so that the voltage signal loss of the data signal cancellation line 700 is consistent with the voltage signal loss of the data line 400, which makes it convenient for setting the voltage signal of the data signal cancellation line 700. The width of the data signal cancellation line 700 is equal to the width of the data line 400. Of course, the widths of the data signal cancellation line 700 and the data line 400 may not be equal. When the widths of the data signal cancellation line 700 and the data line 400 are not equal, the voltage signal of the data signal cancellation line 700 and the voltage signal of the data line 400 have opposite polarities and are not equal in absolute value.

Figure 3:
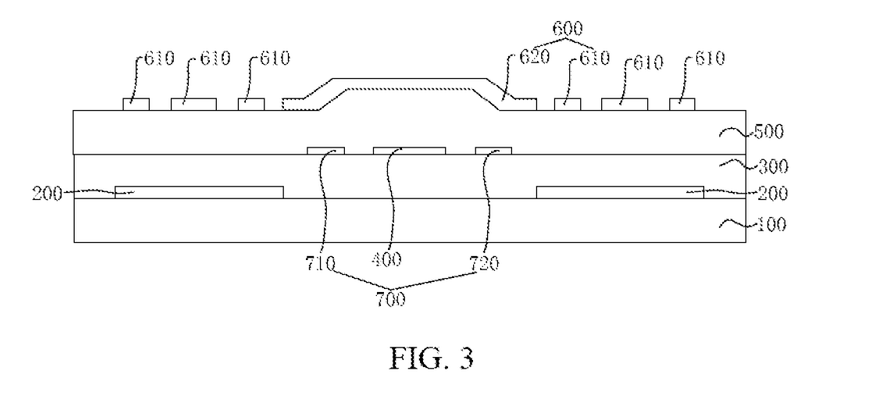
FIG. 3 is a schematic diagram of a first data signal cancellation line, a second data signal cancellation line, and a data line being disposed in a same layer in an array substrate according to a second embodiment of the present application.
Figure 4:
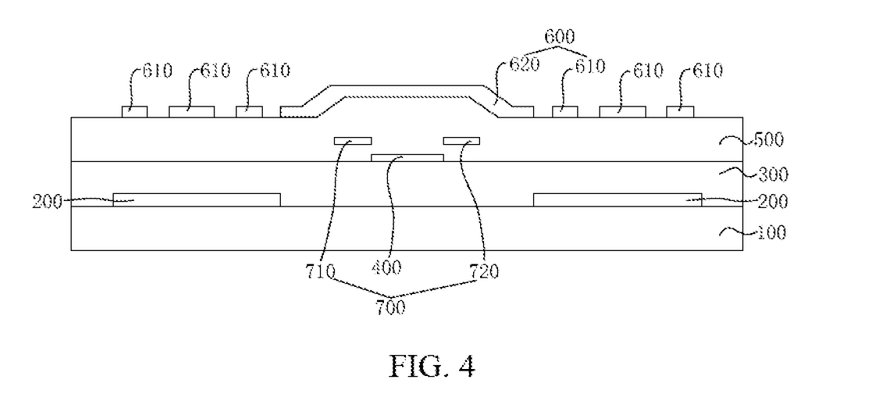
FIG. 4 is a schematic diagram of a first data signal cancellation line and a second data signal cancellation line being disposed in the same layer in an array substrate according to the second embodiment of the present application.
Figure 5:
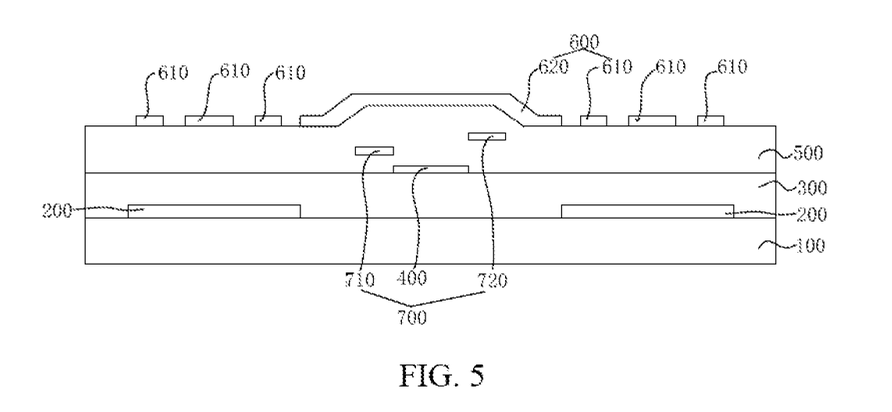
FIG. 5 is a schematic diagram of a first data signal cancellation line, a second data signal cancellation line, and a data line being disposed in different layers in an array substrate according to the second embodiment of the present application.

As shown in FIGS. 3 to 5, as a second embodiment of the present application, which is a further refinement of the first embodiment of the present application, an array substrate 800 is disclosed. The data signal cancellation line 700 includes a first data signal cancellation line 710 and a second data signal cancellation line 720. The first data signal cancellation line 710 is disposed on the left side of the data line 400 and is spaced apart from the data line 400. The second data signal cancellation line 720 is disposed on the right side of the data line 400 and is spaced apart from the data line 400. The voltage signal of the first data signal cancellation line 710 and the voltage signal of the second data signal cancellation line 720 have the same polarity. The voltage signal of the first data signal cancellation line 710 and the voltage signal of the second data signal cancellation line 720 are each opposite in polarity to the voltage signal of the data line 400. In this way, the first data signal cancellation line 710 and the second data signal cancellation line 720 are located on the left and right sides of the data line 400 respectively, so as to prevent the fringe field effect of the data line 400 from affecting the first common electrode 610 or the pixel electrode layer 200 near the data line 400. Furthermore, the voltage signals of the first data signal cancellation line 710 and the second data signal cancellation line 720 are each opposite in polarity to the voltage signal of the data line 400. The signal with the equal magnitude of the voltage signal of the data line 400 is divided into the first data signal cancellation line 710 and the second data signal cancellation line 720 respectively, so as to reduce the influence of the first data signal cancellation line 710 and the second data signal cancellation line 720 on the nearby common electrode layer 600 or pixel electrode layer. The first data signal cancellation line 710, the second data signal cancellation line 720, and the data line 400 are all disposed at the same layer.

Of course, the first data signal cancellation line 710 and the second data signal cancellation line 720 may also be disposed at different layers from the data line 400. When both the first data signal cancellation line 710 and the second data signal cancellation line 720 are disposed in different layers from the data line 400, the first data signal cancellation line 710 and the second data signal cancellation line 720 may be disposed in the same layer. At this time, the distance from the first data signal cancellation line 710 to the first insulating layer 300 is greater than the distance from the data line 400 to the first insulating layer 300. The first data signal cancellation line 710 and the second data signal cancellation line 720 may also be disposed in different layers. In the direction from the pixel electrode layer 200 to the common electrode layer 600, the interval between the first data signal cancellation line 710 and the data line 400 along the direction parallel to the substrate is zero, and the interval between the second data signal cancellation line 720 and the data line 400 along the direction parallel to the substrate is zero, where designers can choose a design depending on actual needs, which is not limited here.

Figure 6:
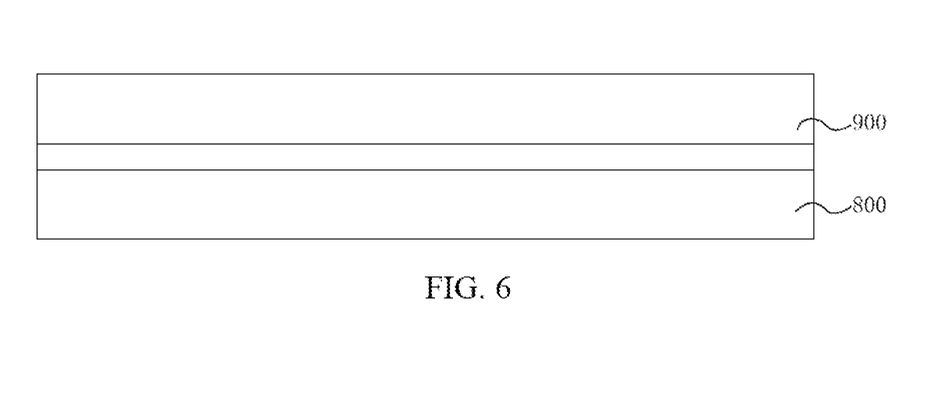
FIG. 6 is a partial structural schematic diagram of a display device according to a third embodiment of the present application.

As shown in FIG. 6, as a third embodiment of the present application, a display device is disclosed. The display device includes a display panel. The display panel includes a color filter substrate 900 and the array substrate 800 described in the above embodiments. The color filter substrate 900 and the array substrate 800 are aligned and assembled together. In the display device in this embodiment, by arranging the data signal cancellation line 700 on the array substrate 800, the data signal cancellation line 700 can alleviate the influence brought by the voltage change of the data line 400, thereby improving the problem that the display panel is prone to horizontal crosstalk or uneven brightness due to the voltage change of the data line 400.

Figure 7:
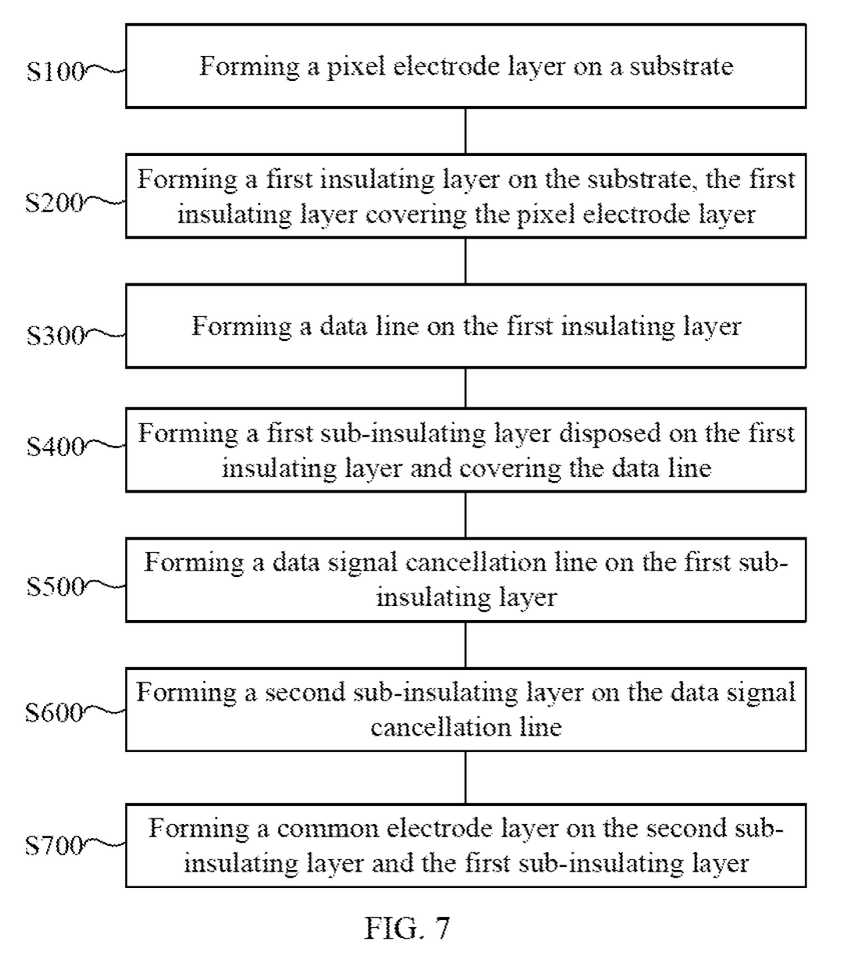
FIG. 7 is a flowchart of a manufacturing method according to a fourth embodiment of the present application.

As shown in FIG. 7, as a fourth embodiment of the present application, a manufacturing method is disclosed. The shown manufacturing method is applied to the array substrate described in the above embodiments, and the manufacturing method includes:

S100: forming a pixel electrode layer on a substrate;
S200: forming a first insulating layer on the substrate, and the first insulating layer covers the pixel electrode layer;
S300: forming a data line on the first insulating layer;
S400: forming a first sub-insulating layer that is disposed on the first insulating layer and that covers the data line;
S500: forming a data signal cancellation line on the first sub-insulating layer;
S600: forming a second sub-insulating layer on the data signal cancellation line;
S700: forming a common electrode layer on the second sub-insulating layer and the first sub-insulating layer;
where the first sub-insulating layer and the second sub-insulating layer collectively form a second insulating layer, which are only suitable for the fabrication when the data signal cancellation line and the data line are located in different layers.

As a fifth embodiment of the present application, a driving circuit is disclosed for driving the array substrate described in the above embodiments. The driving circuit includes a drive chip. The drive chip includes multiple groups of pins. A group of said pins includes a first pin and a second pin. The first pin is connected to the data line, and the second pin is connected to the data signal cancellation line. The first pin outputs a first voltage signal to the data line, and the second pin outputs a second voltage signal to the data signal cancellation line. The first voltage signal and the second voltage signal have opposite polarities.

The driving circuit further includes a polarity inversion unit, a power supply module and a control module. The power supply module outputs voltages to the first pin and the second pin for output. The control module controls the magnitude of the output voltage of the power supply module. The polarity inversion unit is connected with the power supply module and with the second pin. The polarity inversion unit acquires the first voltage signal output by the power supply module to the first pin, and outputs the second voltage signal formed by inversion of the polarity of the first voltage signal to the second pin.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. An array substrate, comprising:
a substrate;
a pixel electrode layer, disposed on the substrate;
a first insulating layer, disposed on the substrate and covering the pixel electrode layer;
a plurality of data lines, disposed on the first insulating layer; and
a second insulating layer, disposed on the first insulating layer and covering the plurality of data lines;
a common electrode layer, disposed on the second insulating layer, the common electrode layer comprising a plurality of common shield electrode layers; and
a plurality of data signal cancellation lines, disposed between the common electrode layer and the first insulating layer, wherein the plurality of data signal cancellation lines are disposed in one-to-one correspondence with the plurality of data lines;
wherein a voltage signal of each of the plurality of data signal cancellation lines has an opposite polarity to a voltage signal of the respective data line; wherein each of the plurality of data signal cancellation lines is disposed along an extending direction of the respective data line; wherein in a direction from the pixel electrode layer toward the common electrode layer, each of the plurality of common shield electrode layers covers one respective data signal cancellation line and one respective data line; wherein a gap is defined between a projection of each data line along a direction perpendicular to the substrate and a projection of the respective data signal cancellation line along the direction perpendicular to the substrate, and wherein a width of the gap is greater than or equal to a preset distance;
wherein the plurality of data signal cancellation lines are disposed on the first insulating layer, and are disposed in a same layer as the plurality of data lines; wherein a width of the gap formed between each data signal cancellation line and the respective data line is greater than the preset distance, the preset distance being greater than zero and being less than or equal to a difference between a width of the common electrode layer and a total width of the respective data signal cancellation line and respective data line.

2. The array substrate of claim 1, further comprising a gate metal layer, a source metal layer, a drain metal layer, and a semiconductor layer; wherein the gate metal layer is formed on the substrate; the first insulating layer covers the gate metal layer; the semiconductor layer is disposed on the first insulating layer; the source metal layer is disposed on the semiconductor layer; the drain metal layer is disposed on the semiconductor layer and opposite to the source metal layer; the drain metal layer is connected to the respective data line; the second insulating layer is disposed on the drain metal layer and the source metal layer; wherein the first insulating layer defines a via hole, and the pixel electrode layer is connected to the source metal layer through the via hole.

3. The array substrate of claim 1, wherein the common electrode layer comprises a first common electrode disposed above the pixel electrode layer, the common shield electrode layer comprises a second common electrode disposed above the respective data line, and wherein the second common electrode covers the respective data line and respective data signal cancellation line.

4. The array substrate of claim 1, wherein each of the plurality of data signal cancellation lines has an equal width to that of the respective data line.

5. The array substrate of claim 1, wherein each of the plurality of data signal cancellation lines is operative to output the voltage signal with an opposite polarity and an equal magnitude with respect to the voltage signal of the respective data line.

6. The array substrate of claim 1, wherein a distance between each of the plurality of data lines and the respective data signal cancellation line is greater than or equal to 2.5 microns.

7. A display device, comprising a color filter substrate and an array substrate, the color filter substrate and the array substrate being aligned and assembled together;
wherein the array substrate comprises a substrate, a pixel electrode layer, a first insulating layer, a plurality of data lines, a second insulating layer, a common electrode layer, and a plurality of data signal cancellation lines;
wherein the pixel electrode layer is disposed on the substrate; the first insulating layer is disposed on the substrate and covers the pixel electrode layer; the plurality of the data lines are disposed on the first insulating layer; the second insulating layer is disposed on the first insulating layer and covers the plurality of data lines; the common electrode layer is disposed on the second insulating layer, and comprises a plurality of common shield electrode layers; wherein the plurality of data signal cancellation lines are disposed between the common electrode layer and the first insulating layer, and wherein the plurality of data signal cancellation lines are disposed in one-to-one correspondence with the plurality of data lines;
wherein a voltage signal of each of the plurality of data signal cancellation lines has an opposite polarity to a voltage signal of the respective data line; wherein each of the plurality of data signal cancellation lines is disposed along an extending direction of the respective data line; wherein in a direction from the pixel electrode layer toward the common electrode layer, each of the plurality of common shield electrode layers covers one respective data signal cancellation line and one respective data line; wherein a gap is defined between a projection of each data line and a projection of the respective data signal cancellation line, and wherein a width of the gap is greater than or equal to a preset distance;
wherein the plurality of data signal cancellation lines are disposed on the first insulating layer, and are disposed in a same layer as the plurality of data lines; wherein a width of the gap formed between each data signal cancellation line and the respective data line is greater than the preset distance, the preset distance being greater than zero and less than or equal to a difference between a width of the common electrode layer and a total width of the respective data signal cancellation line and respective data line.

8. The display device of claim 7, wherein a distance between each data line and the respective data signal cancellation line is greater than or equal to 2.5 microns.

9. A driving circuit, comprising a substrate, a pixel electrode layer, a first insulating layer, a plurality of data lines, a second insulating layer, a common electrode layer, and a plurality of data signal cancellation lines; wherein the pixel electrode layer is disposed on the substrate; the first insulating layer is disposed on the substrate and covers the pixel electrode layer; the plurality of data lines are disposed on the first insulating layer; the second insulating layer is disposed on the first insulating layer and covers the plurality of data lines; the common electrode layer is disposed on the second insulating layer, and comprises a plurality of common shield electrode layers; the plurality of data signal cancellation lines are disposed between the common electrode layer and the first insulating layer; wherein the plurality of data signal cancellation lines are disposed in one-to-one correspondence with the plurality of data lines; wherein a voltage signal of each of the plurality of data signal cancellation lines has an opposite polarity to a voltage signal of the respective data line; wherein each of the plurality of data signal cancellation lines is disposed along an extending direction of the respective data line; wherein in a direction from the pixel electrode layer toward the common electrode layer, each of the plurality of common shield electrode layers covers one data signal cancellation lines and one of the data lines; a gap is formed between a projection of the data line along a direction perpendicular to the substrate and a projection of the data signal cancellation line along the direction perpendicular to the substrate, and wherein a width of the gap is greater than or equal to a preset distance;
wherein the plurality of data signal cancellation lines are disposed on the first insulating layer, and are disposed in a same layer as the plurality of data lines; wherein a width of the gap formed between each data signal cancellation line and the respective data line is greater than the preset distance, the preset distance being greater than zero and being less than or equal to a difference between a width of the common electrode layer and a total width of the respective data signal cancellation line and respective data line;
wherein the driving circuit comprises a drive chip, the drive chip comprising a plurality of groups of pins; wherein each group of pins comprises a first pin and a second pin, wherein the first pin is connected to the respective data line, the second pin is connected to the respective data signal cancellation line; the first pin is operative to output a first voltage signal to the respective data line, the second pin is operative to output a second voltage signal to the respective data signal cancellation line; and wherein the first voltage signal and the second voltage signal have opposite polarities.

10. The driving circuit of claim 9, further comprising a polarity inversion unit, a power supply module, and a control module; the power supply module is configured to output voltages to the first pin and the second pin for output; the control module is configured to control a magnitude of each the output voltages of the power supply module; the polarity inversion unit is connected to the power supply module and to the second pin; the polarity inversion unit is configured to acquire the first voltage signal that output by the power supply module to the first pin, and output the second voltage signal to the second pin, the second voltage signal being created by inversion of a polarity of the first voltage signal.

* * * * *